Dec. 1, 1970  F. SPEGLIC ET AL  3,543,403
CHEESE PRODUCTION
Filed Dec. 9, 1968  5 Sheets-Sheet 1
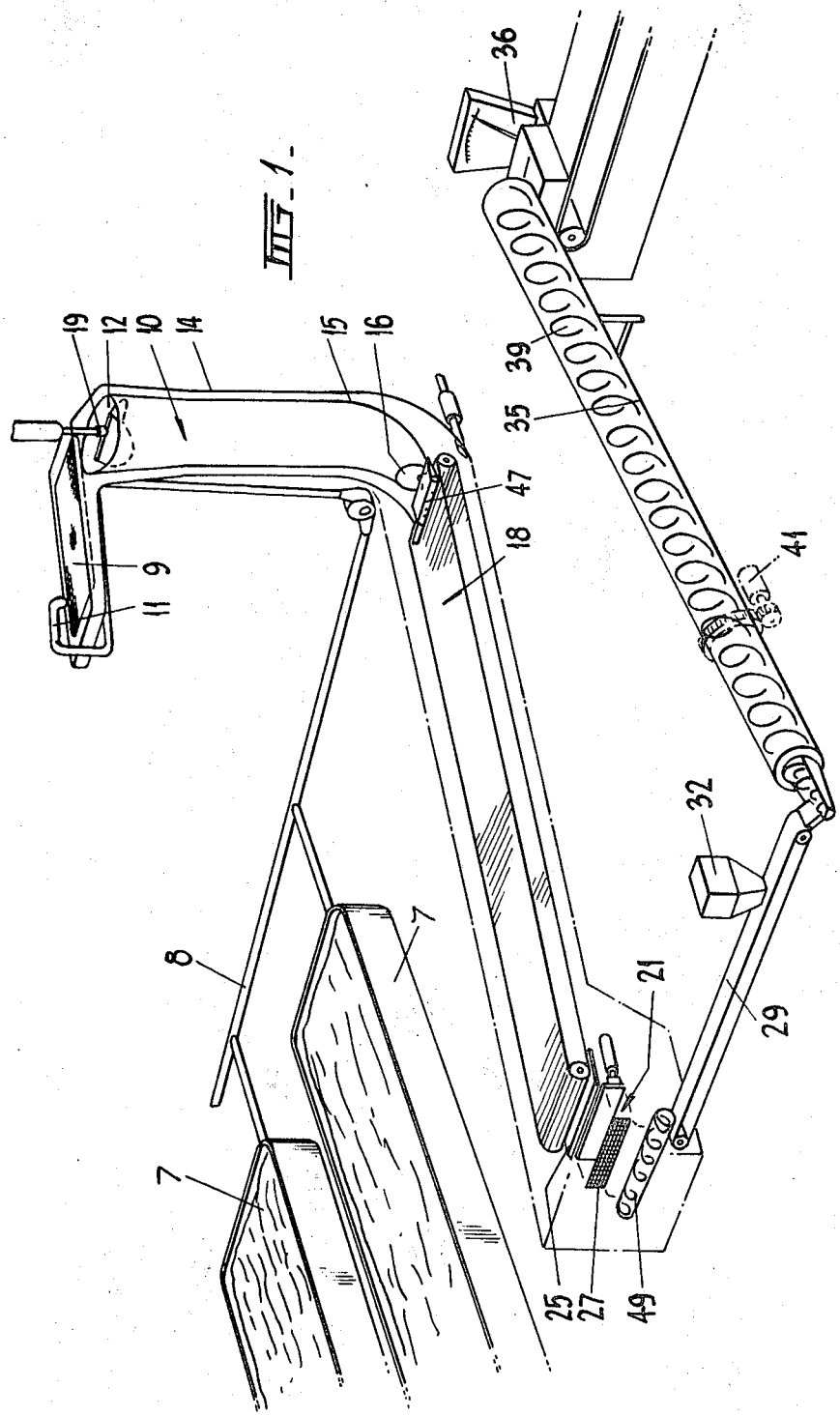
FRANC SPEGLIC
MILAN VYHNALEK — Inventors
Sommers & Young — Attorneys

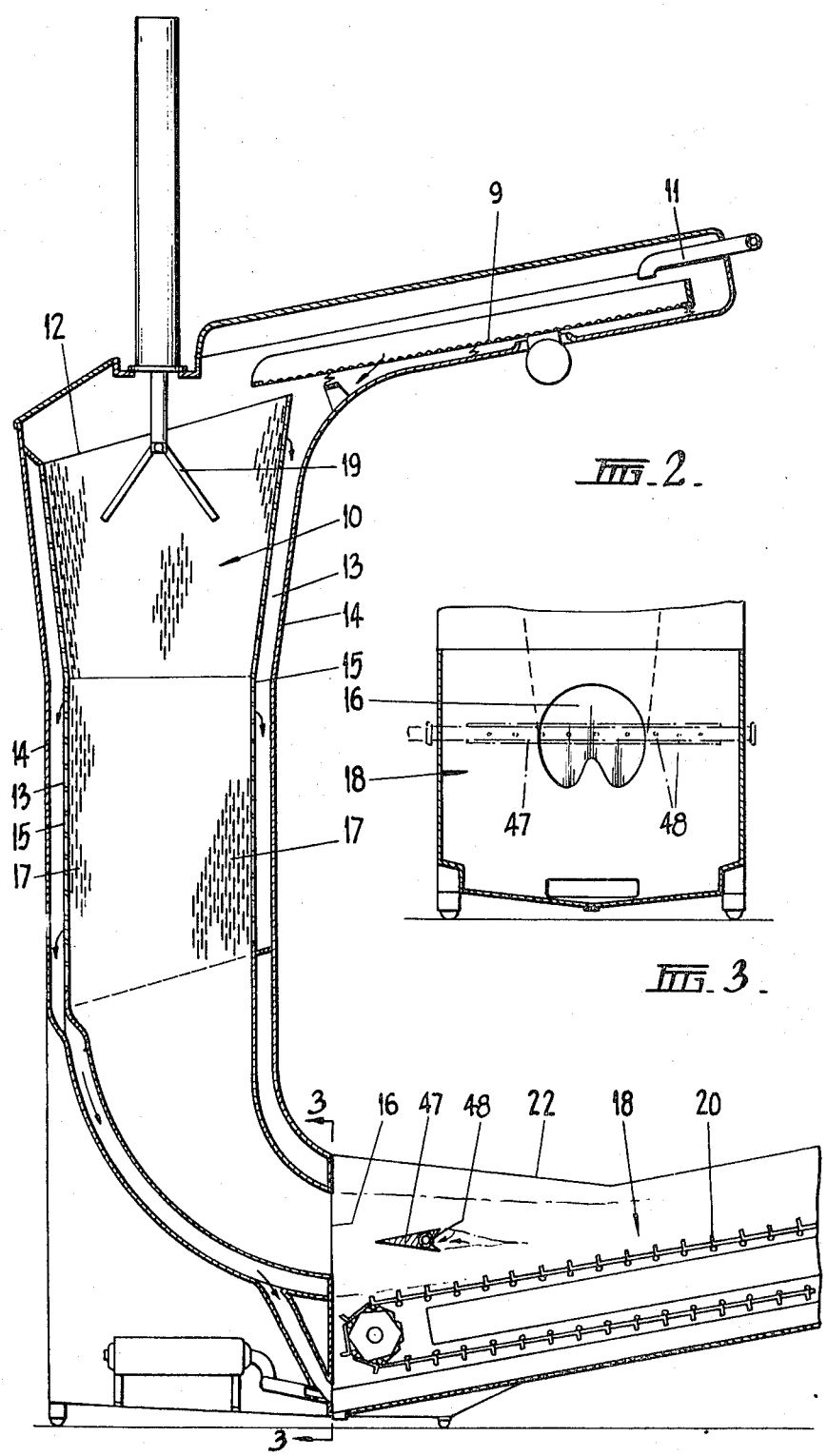

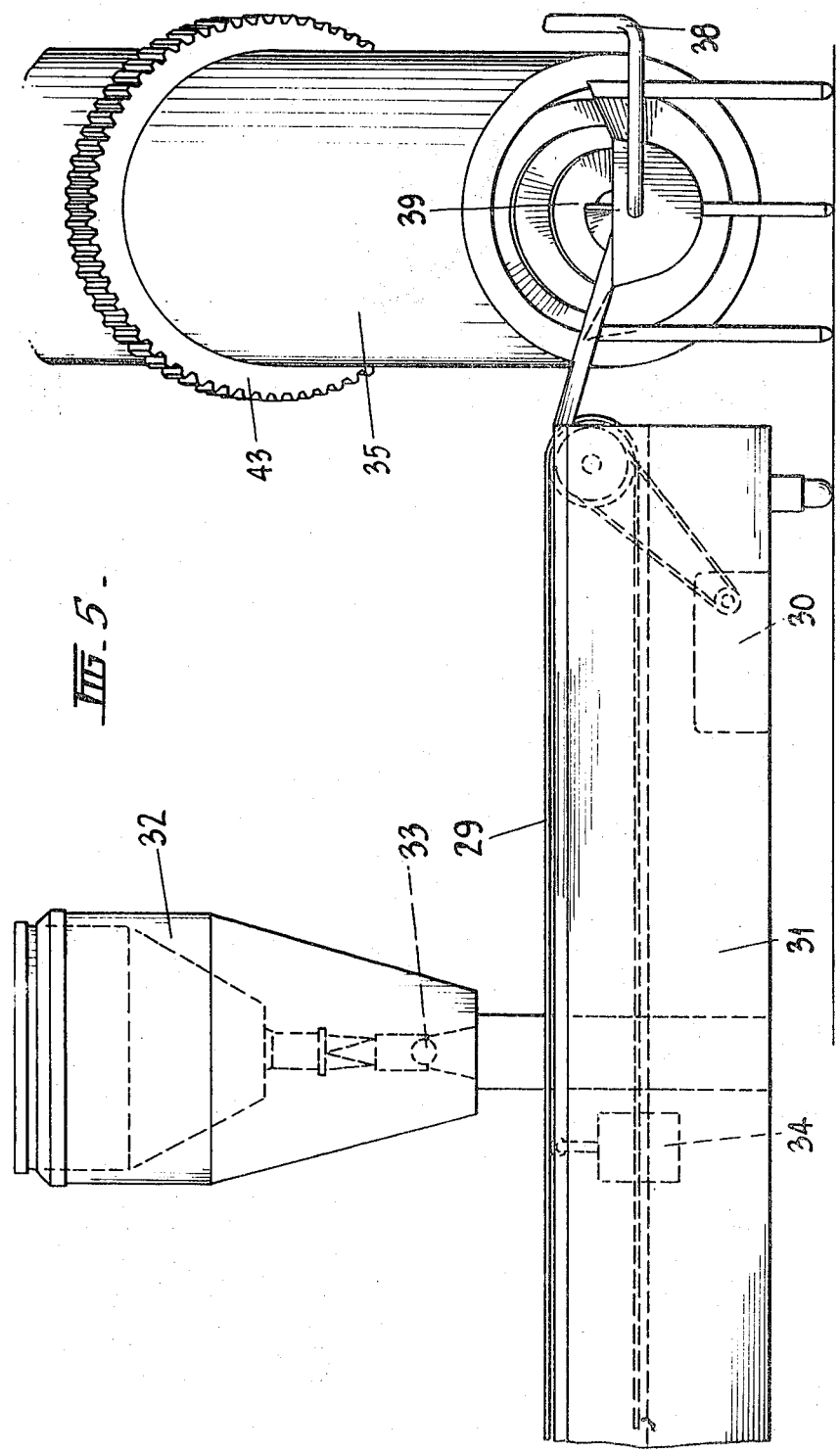

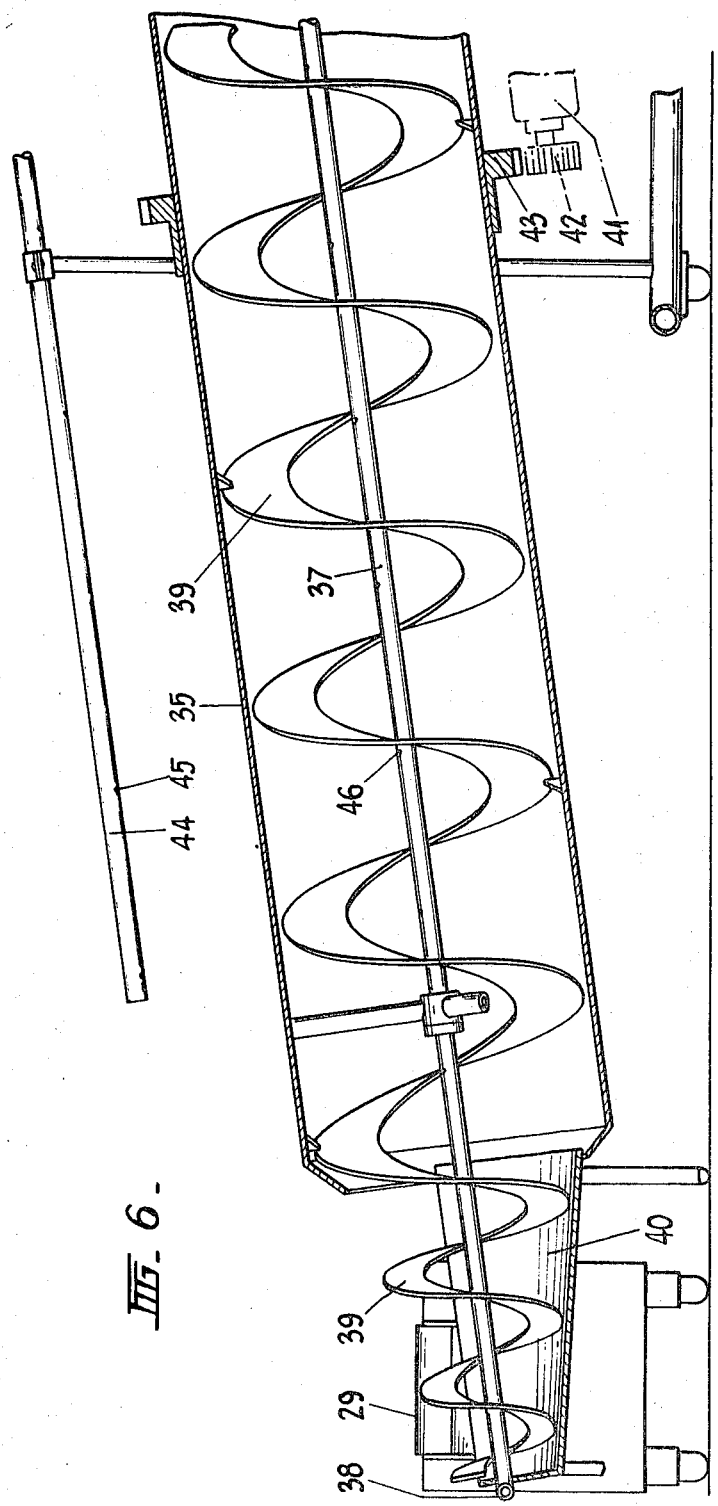

United States Patent Office 3,543,403
Patented Dec. 1, 1970

3,543,403
CHEESE PRODUCTION
Franc Speglic, Havenview, Tasmania, and Milan Vyhnalek, Burnie, Tasmania, Australia, assignors to Lact-O-Matic Proprietary Limited, Broadmeadows, Victoria, Australia, a corporation of Victoria
Filed Dec. 9, 1968, Ser. No. 782,069
Claims priority, application Australia, Dec. 11, 1967, 31,009
Int. Cl. A01j 25/00
U.S. Cl. 31—89                                    12 Claims

ABSTRACT OF THE DISCLOSURE

This invention provides a process and apparatus whereby curd is separated from a slurry of curd and whey, fused, milled, salted, mellowed and packaged.

---

Figure 4:
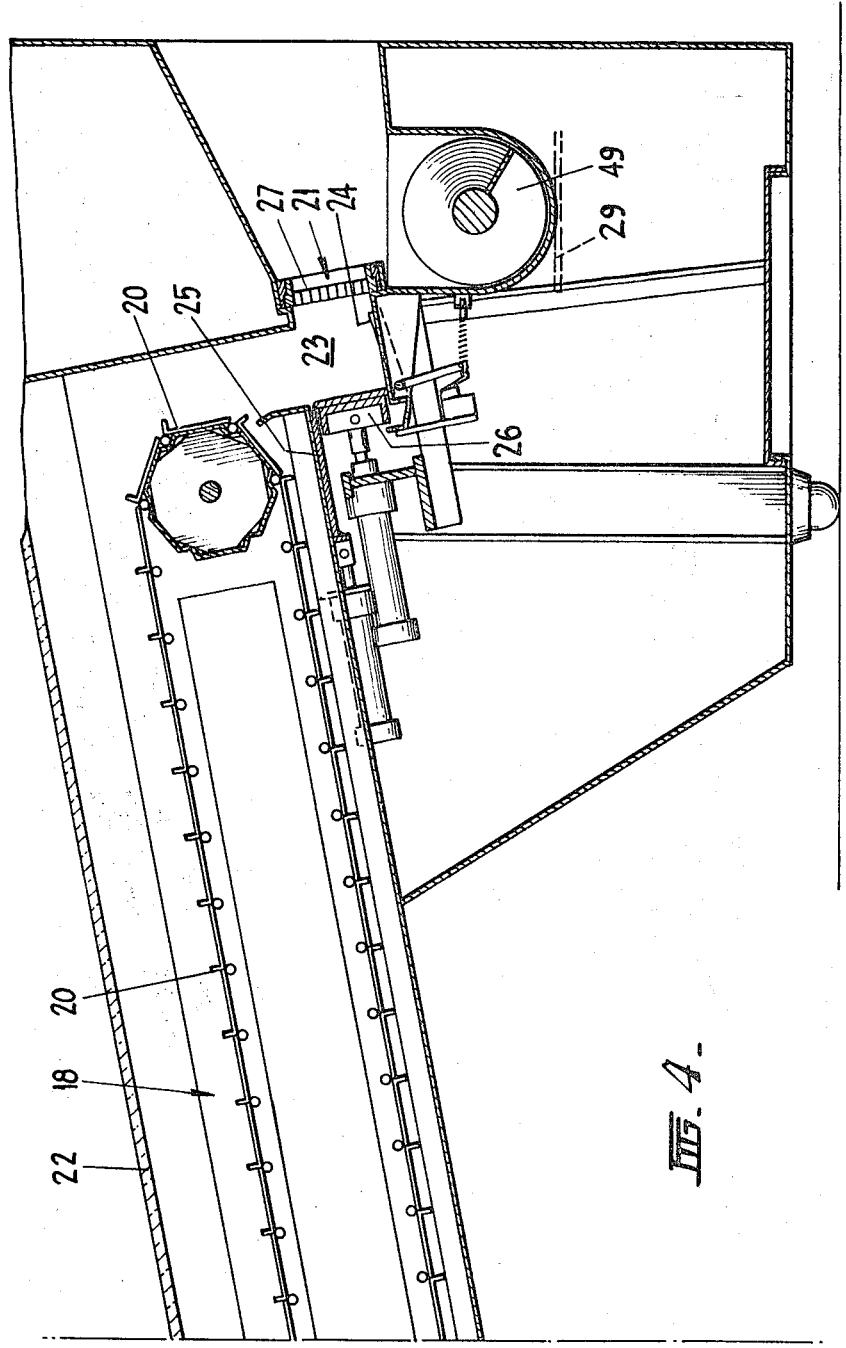

This invention relates to cheese production and is particularly directed to the curd fusing and conditioning (mellowing) operations involved therein.

The traditional methods of cheese production include several manual operations at various stages of the process and in an attempt to eliminate these manual operations various mechanical steps have been introduced with varying degrees of success. One of the major drawbacks of these proposals has been prohibitive cost and it is accordingly the principal objective of this invention to provide a fully mechanized process for the manufacture of cheese capable of application in established cheese production plants at low cost.

It is a further objective of this invention to provide simple and effective apparatus for use in the continuous production of cheese.

With the above stated principal objective in view there is provided according to the invention a process for the continuous manufacture of cheese comprising the steps of:

(a) delivering a slurry of curd and whey to a whey removal station,
(b) passing the separated curd to a curd fusing tower,
(c) removing residual whey from the curd during its passage through the fusing tower,
(d) feeding the fused curd to a cheddaring belt for passage to a milling and salting station, and,
(e) passing the milled salted curd through a conveyor to a packing station, mellowing of the milled salted curd being effected during passage through the conveyor.

In use the method comprising the above steps (a) to (e) eliminates all manual operations in the production of cheese resulting in faster and more economical rate of production.

There is further provided according to the invention apparatus for use in the continuous production of cheese comprising:

(a) means for separating whey from a slurry of curd and whey,
(b) a fusing tower for receiving curd from the separating means and including means for removing residual quantities of whey from the curd fusing therein, and a discharge port shaped to permit fused curd to pass from the tower and spread evenly onto a moving cheddaring belt.
(c) means for separating fused curd passing from the cheddaring belt into discrete particles and mixing metered quantities of salt with said particles, and
(d) a conveyor for effecting curing of the salted particles during passage thereof to a packing station.

This apparatus permits the method of the invention to be readily put into effect and by the elimination of any manual steps reduces the possibility of contamination of the finished product.

A practical application of the invention will now be described and this description will include details of a practical apparatus in accordance with the invention, reference being made to the accompanying drawings in which:

FIG. 1 is a general and diagrammatic view of a cheese making plant in accordance with the invention,
FIG. 2 is a detailed cross-section view of the tower shown in FIG. 1,
FIG. 3 is a view of the tower discharge port taken on the line 3—3 of FIG. 2,
FIG. 4 is a detailed cross-sectional elevation of the cheddaring belt and milling apparatus,
FIG. 5 is a general elevation of the salting conveyor, including the charge end of the conditioning conveyor, and
FIG. 6 is a part cross-sectional elevation of the conditioning conveyor.

Referring now to the drawings a slurry of discrete curd particles and whey is pumped continuously from a bank of conventional vats 7 via pipe 8 to a dewatering screen 9 located adjacent the top of the curd fusing tower 10. The dewatering screen comprises a rectangular wire mesh screen 9 vibrating in a plane inclined to the horizontal and covered with a synthetic fibre gauze (not shown).

The slurry of curd and whey is fed to the upper end of the screen via a telescopic discharge tube 11 and passes across the screen towards the open top 12 of the fusing tower 10. Under the action of gravity and the vibratory action of the screen 9, whey is removed from the discrete curd particles, the curd particles falling into the fusing tower and the whey being drained to waste via the space 13 defined by the outer jacket 14 surrounding the tower 10.

By adjusting of the position of the telescopic discharge tube 11 in relation to the dewatering screen 9 varying rates of flow of the curd and whey slurry may be readily handled by the dewatering screen. The fusing tower 10 comprises an upstanding tube 15 of substantially circular cross section tapering to a discharge port 16 having a substantially horizontal axis. Curd discharged from the dewatering screen falls into the tube 15 and is compressed therein under the action of its own weight to flow from the discharge port 16 as a substantially homogenous mass.

To facilitate the removal of whey expressed from the curd during fusing in the tower slit shaped apertures 17 are provided in the walls of the tube 15.

The fused curd is forced by its own weight through the discharge port 16 onto a moving cheddaring conveyor 18 and for use in cases where difficulty is encountered with this discharge a hydraulically operated plunger 19 is arranged to operate in the tower and compress the curd, the plunger 19 being collapsible on its return stroke to permit curd to continue falling into the tube 15 during this operation. Air injection is also used at the base of the tower to allow curd to float out of the discharge port 16 on a cushion of air.

As the fused curd is continuously discharged from the discharge port 16 as a mass it begins to expand as a result of the bacteriological action of the cheese making process and in order that this expansion may proceed evenly the mouth of the discharge port 16 must be suitably shaped to tension the curd to initiate the cheddaring thereof and also mould the mass of fused curd into a desired shape for laying on the cheddaring conveyor. It has been found that for good results the cross sectional shape of the port should be of a substantially inverted heart shape as shown in FIG. 3 within a ridge extending into the tower, although variations of this shape are possible.

The cheddaring conveyor 18 comprises an endless metal belt structure 20 which transports the fused curd at slow speed to a milling station 21 during the expansion due to bacteriological action previously referred to. The cheddaring belt is enclosed by a suitable hood 22 and the temperature within the hood may be maintained at any desired level by suitable air heating equipment.

The cheddaring belt 20 continuously delivers the expanded fused curd to the milling station 21 where it is divided into discrete chips prior to mellowing.

The milling station indicated by reference 21 in FIG. 1 is shown in detail in FIG. 4. The curd mass is delivered by the action of gravity from the belt 20 to fall into a receptacle 23. The floor of the receptacle 23 is provided with a spring loaded section 24 operable under the weight of curd mass to actuate electrical or other suitable switching means to in turn actuate a knife 25 to sever a section of the falling curd mass. After this knife 25 has severed a portion of the curd a ram 26 forces this curd through the opposite wall 27 of the receptacle. The wall 27 is constituted by a grid of fixed knife blades which divide the curd mass into chips as it is forced therethrough by the ram 26.

The milled curd chips pass from the milling station via conveyor 49 to a salting conveyor for passage to a conditioning conveyor.

The salting conveyor shown in detail (in part) in FIG. 5 comprises an endless belt conveyor 29 driven by a motor 30 and supported by suitable framework 31. A salt hopper 32 is located above the conveyor 29 and includes power operated metering means indicated generally by the reference 33 to deliver salt to chipped curd passing on the conveyor 29. Sensing means 34 located beneath the conveyor 29 automatically control the amount of salt delivered from the hopper 32 by the metering means 33 in the desired proportion to the weight of chipped curd on the conveyor 29. For the sake of brevity the associated equipment controlling this function has not been illustrated in detail.

The conditioning (or mellowing) conveyor shown in FIGS. 5 and 6 comprises an extended tube 35 of circular cross-section rotating about its longitudinal axis, which axis inclines upwardly from the conveyor belt 29 to an automatic weighing and packing station 36 (shown in FIG. 1).

Referring now to FIG. 6 the conditioning tube 35 rotates about an axis comprising a hollow tube 37 connected at one of its extremities 38 with a source of cleaning fluid. A helical ribbon flight conveyor 39 extends from the charging end 40 of the conditioning tube throughout its length and serves to convey chipped and salted curd from the conveyor belt 29 to the weighing station 36. The tube 37 is driven by a motor 41 through gearing 42, 43, the speed of the drive being variable to suit the conditioning requirements of a particular cheese batch. Mounted above the tube 35 is a duct 44 also connected with a source of cleaning fluid and the duct 44 and the axial tube 37 are each provided with spaced jets 45, 46 to direct cleaning fluid over the equipment when desired.

After leaving this conveyor the mellowed curd chips are weighed at 36 and fed to conventional hoop packing equipment, and transferred in the hoops to a maturing room.

The apparatus described includes associated equipment for washing of all the conveyors and the like while in operation to prevent contamination and in use facilitates the continuous production of cheese with the elimination of all major manual operation in the conventional processes. Associated with the cheddaring conveyor 18 means for sensing the width of the curd thereon may be provided to control the speed of this conveyor and if desired pH sensing means may also be included. The entire cheese contacting surfaces of the structure described are preferably fabricated from stainless steel to resist corrosion and to facilitate the in situ cleaning operation briefly described.

As shown in FIG. 2a transverse follow knife 47 may be located adjacent the tower discharge port 16 to divide the curd mass passing therefrom. The knife 47 is connected with a source of vacuum and its trailing edge 48 provided with a series of orifices such that any whey trapped within the fused curd may be withdrawn.

We claim:

1. A process for the continuous manufacture of cheese comprising the steps of:
    (a) separating the cud from a slurry of curd and whey,
    (b) passing the separated curd to a curd fusing tower,
    (c) removing residual whey from the curd during its passage through the fusing tower,
    (d) feeding the fused curd to a cheddaring belt for passage to a milling and salting station, and
    (e) passing the milled salted curd through a conveyor to a packing station, mellowing of the milled salted curd being effected during passage through the conveyor.

2. A process according to claim 1 including the step of subjecting the curd to pressure in the curd fusing tower.

3. A process according to claim 1 including the step of opening the fused curd and removing residual whey therefrom before it is fed to the cheddaring belt.

4. A process according to claim 1 wherein the rate of delivery of the fused curd to the milling station is automatically controlled responsive to the condition of the curd on the cheddaring belt, and the amount of salt added to the milled curd at the salting station is automatically controlled in accordance with the amount of milled curd passing therethrough.

5. Apparatus for use in the continuous production of cheese comprising:
    (a) means for separating whey from a slurry of curd and whey,
    (b) a fusing tower to receive curd from the separating means and including means for removing residual quantities of whey from the curd during fusing therein, and a discharge port shaped to discharge and evenly spread the fused curd onto a moving cheddaring belt,
    (c) means for separating fused curd passing from the cheddaring belt into discrete particles and mixing metered quantities of salt with said particles, and
    (d) a conveyor for effecting curing of the salted particles during passage thereof to a packing station.

6. Apparatus according to claim 5 including means for opening the fused curd and removing residual whey therefrom before it is fed to the cheddaring belt.

7. Apparatus according to claim 5 including a hollow knife structure connected with a source of vacuum and provided with apertures on its trailing edge, said structure being positioned adjacent the discharge port to divide the curd mass passing therethrough and remove residual whey entrained in the curd mass.

8. Apparatus according to claim 5 wherein means governed by the condition of the curd mass on the cheddaring belt to control the speed of the cheddaring belt.

9. Apparatus according to claim 5 wherein the means for separating the fused curd passing from the cheddaring belt comprises a knife to sever a portion of the fused curd, a grid and means to force the severed curd portion through the grid to divide it into discrete particles.

10. Apparatus according to claim 5 including means to mix salt with the discrete curd particles at a salting station automatic means to control the amount of salt added to the curd particles in accordance with the amount of curd particles passing therethrough.

11. Apparatus according to claim 5 wherein the curing conveyor comprises a cylinder for rotation about its axis, and having an internal helical ribbon flight to facilitate the passage of salted curd particles therethrough.

12. Apparatus according to claim 5 wherein the discharge portion of the tower includes means for tensioning fused curd passing therethrough to facilitate cheddaring of the curd on the cheddaring belt, means for supplying compressed air to the base of the fusing tower in the vicinity of the discharge port to prevent clogging of the discharge port with fused curd, and means for exerting pressure of the curd particles within the fusing tower.

References Cited

UNITED STATES PATENTS

| | | | |
|---|---|---|---|
| 2,781,269 | 2/1957 | Harper et al. | 99—116 |
| 2,917,827 | 12/1959 | Lankford | 31—46 |
| 3,060,575 | 10/1962 | Czulak | 31—46 X |
| 3,438,131 | 4/1969 | Ubbels et al. | 31—46 |
| 3,468,026 | 9/1969 | Robertson et al. | 31—89 |

HUGH R. CHAMBLEE, Primary Examiner

U.S. Cl. X.R.

31—46; 99—116